US010650075B2

United States Patent
Liesche et al.

(10) Patent No.: US 10,650,075 B2
(45) Date of Patent: *May 12, 2020

(54) DYNAMIC CONTEXT-SENSITIVE INTEGRATION OF CONTENT INTO A WEB PORTAL APPLICATION BY INSERTING A SUBTREE OF DYNAMIC CONTENT NODES INTO A MEMORY TREE OF CONTENT NODES

(71) Applicant: INTERNATIONAL BUSINESS MACHINES CORPORATION, Armonk, NY (US)

(72) Inventors: Stefan Liesche, Boeblingen (DE); Andreas Nauerz, Boeblingen (DE); Jurgen Schaeck, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,895

(22) Filed: Sep. 4, 2017

(65) Prior Publication Data
US 2018/0018341 A1    Jan. 18, 2018

Related U.S. Application Data

(63) Continuation of application No. 12/440,893, filed as application No. PCT/EP2007/056877 on Mar. 11, 2009, now Pat. No. 9,754,039.

(51) Int. Cl.
*G06F 16/958* (2019.01)

(52) U.S. Cl.
CPC ................. *G06F 16/958* (2019.01)

(58) Field of Classification Search
CPC ................. G06F 17/3089; G06F 16/958
See application file for complete search history.

(56) References Cited

U.S. PATENT DOCUMENTS

| 5,892,905 A | 4/1999 | Brandt et al. |
| 5,941,947 A | 8/1999 | Brown et al. |

(Continued)

FOREIGN PATENT DOCUMENTS

| CN | 101512523 A | 8/2009 |
| DE | 10131571 A1 | 1/2003 |

(Continued)

OTHER PUBLICATIONS

IBM Websphere Portal Server. Product architecture V2.1, Nov. 19, 2001, 31 pg.

(Continued)

*Primary Examiner* — Daniel C. Murray
(74) *Attorney, Agent, or Firm* — Cuenot, Forsythe & Kim, LLC (57) ABSTRACT

A computer system for integration of content elements into a web portal application can include a portal server module for providing a web portal application to at least one user, an aggregation module, coupled to the portal server module, for integrating content nodes representing content elements into a memory tree reflecting the web portal application, a dynamic assembly module coupled to the aggregation module, a context launch transformation module coupled to the dynamic assembly module for construction of subtrees of dynamic content nodes, and a context observer module coupled to the dynamic assembly module.

18 Claims, 4 Drawing Sheets

(56) References Cited

U.S. PATENT DOCUMENTS

| | | | |
|---|---|---|---|
| 6,038,668 | A | 3/2000 | Chipman et al. |
| 6,055,637 | A | 4/2000 | Hudson et al. |
| 6,182,142 | B1 | 1/2001 | Win et al. |
| 6,233,576 | B1 | 5/2001 | Lewis |
| 6,327,628 | B1 | 12/2001 | Anuff et al. |
| 6,381,579 | B1 | 4/2002 | Gervais |
| 6,389,424 | B1* | 5/2002 | Kim .................. G06F 17/30256 |
| 6,397,222 | B1 | 5/2002 | Zellweger |
| 6,498,795 | B1* | 12/2002 | Zhang ............... G06F 17/30864 370/400 |
| 6,643,661 | B2 | 11/2003 | Polizzi et al. |
| 6,832,263 | B2 | 12/2004 | Polizzi et al. |
| 6,944,818 | B2* | 9/2005 | Newman ........... G06F 17/30961 345/619 |
| 7,043,468 | B2 | 5/2006 | Forman et al. |
| 7,051,033 | B2 | 5/2006 | Agarwal et al. |
| 7,085,994 | B2 | 8/2006 | Gvily |
| 7,118,184 | B2 | 10/2006 | Harada et al. |
| 7,158,981 | B2 | 1/2007 | Agarwal et al. |
| 7,266,827 | B1 | 9/2007 | Sievert |
| 7,337,392 | B2* | 2/2008 | Lue .................... G06F 17/30905 707/E17.121 |
| 7,475,354 | B2 | 1/2009 | Guido et al. |
| 7,493,563 | B2 | 2/2009 | Bohn et al. |
| 7,523,174 | B2 | 4/2009 | Junghuber et al. |
| 7,653,659 | B2 | 1/2010 | Kussmaul et al. |
| 7,716,665 | B2 | 5/2010 | Buehler et al. |
| 7,788,340 | B2 | 8/2010 | Jolley et al. |
| 7,810,036 | B2 | 10/2010 | Bales et al. |
| 7,822,830 | B2 | 10/2010 | Junghuber et al. |
| 7,836,460 | B2 | 11/2010 | Kussmaul et al. |
| 7,860,820 | B1 | 12/2010 | Rajkumar et al. |
| 7,904,818 | B2 | 3/2011 | Lauridsen et al. |
| 7,949,574 | B2 | 5/2011 | Patel et al. |
| 8,108,395 | B2 | 1/2012 | Kussmaul et al. |
| 8,135,753 | B2 | 3/2012 | Zhao |
| 8,140,976 | B2 | 3/2012 | Bohn et al. |
| 8,156,032 | B2 | 4/2012 | Chang et al. |
| 8,171,389 | B2 | 5/2012 | Wang et al. |
| 8,261,271 | B2 | 9/2012 | Polizzi et al. |
| 8,332,763 | B2 | 12/2012 | Zhang et al. |
| 8,356,040 | B2 | 1/2013 | Letourneau |
| 8,527,636 | B2 | 9/2013 | Heymann et al. |
| 8,527,893 | B2 | 9/2013 | Agarwal et al. |
| 8,615,711 | B2 | 12/2013 | Lauridsen et al. |
| 8,769,439 | B2 | 7/2014 | Nauerz et al. |
| 9,754,039 | B2 | 9/2017 | Liesche et al. |
| 10,068,003 | B2* | 9/2018 | LeTourneau ............ G06F 17/10 |
| 10,394,785 | B2* | 8/2019 | LeTourneau .......... G06F 16/322 |
| 2001/0034771 | A1 | 10/2001 | Hutsch et al. |
| 2002/0005867 | A1 | 1/2002 | Gvily |
| 2002/0023122 | A1 | 2/2002 | Polizzi et al. |
| 2002/0023158 | A1 | 2/2002 | Polizzi et al. |
| 2002/0052954 | A1 | 5/2002 | Polizzi et al. |
| 2002/0194255 | A1 | 12/2002 | Hellenthal |
| 2003/0056026 | A1 | 3/2003 | Anuff et al. |
| 2003/0145009 | A1 | 7/2003 | Forman et al. |
| 2004/0015476 | A1 | 1/2004 | Twaddle |
| 2004/0015567 | A1 | 1/2004 | Ziebold et al. |
| 2004/0133660 | A1 | 7/2004 | Junghuber et al. |
| 2004/0148392 | A1 | 7/2004 | Cotte |
| 2004/0193699 | A1 | 9/2004 | Heymann et al. |
| 2004/0230679 | A1 | 11/2004 | Bales et al. |
| 2005/0034078 | A1 | 2/2005 | Abbott et al. |
| 2005/0187895 | A1 | 8/2005 | Paya et al. |
| 2005/0188051 | A1 | 8/2005 | Sneh |
| 2005/0192771 | A1 | 9/2005 | Fischer et al. |
| 2005/0198201 | A1 | 9/2005 | Bohn et al. |
| 2005/0256906 | A1* | 11/2005 | Bales .................. G06F 17/3089 |
| 2006/0161672 | A1 | 7/2006 | Jolley et al. |
| 2006/0235935 | A1 | 10/2006 | Ng |
| 2006/0294458 | A1* | 12/2006 | Smith ................. G06F 17/3089 715/202 |
| 2006/0294495 | A1* | 12/2006 | Smith ................. G06F 17/3089 717/105 |
| 2006/0294496 | A1 | 12/2006 | Smith et al. |
| 2007/0006069 | A1* | 1/2007 | Smith ................. G06F 17/3089 715/201 |
| 2007/0136236 | A1* | 6/2007 | Kussmaul .......... G06F 17/3089 |
| 2007/0136329 | A1 | 6/2007 | Kussmaul et al. |
| 2008/0034369 | A1 | 2/2008 | Polizzi et al. |
| 2008/0066002 | A1 | 3/2008 | Nauerz et al. |
| 2008/0098085 | A1 | 4/2008 | Krane et al. |
| 2008/0139191 | A1* | 6/2008 | Melnyk ............. G06F 17/30905 455/419 |
| 2008/0147775 | A1 | 6/2008 | Abbott et al. |
| 2008/0263068 | A1 | 10/2008 | Wang et al. |
| 2008/0263333 | A1 | 10/2008 | Wang et al. |
| 2008/0270463 | A1 | 10/2008 | Wang et al. |
| 2008/0270464 | A1 | 10/2008 | Wang et al. |
| 2009/0222536 | A1 | 9/2009 | Junghuber et al. |
| 2009/0320141 | A1 | 12/2009 | Wang et al. |
| 2010/0042709 | A1 | 2/2010 | Liesche et al. |
| 2010/0070847 | A1* | 3/2010 | Hampton ............ G06F 17/3089 715/234 |
| 2010/0217777 | A1 | 8/2010 | Kussmaul et al. |
| 2010/0313149 | A1 | 12/2010 | Zhang et al. |
| 2011/0029489 | A1 | 2/2011 | Zhao |
| 2011/0125759 | A1 | 5/2011 | Querel et al. |
| 2012/0150659 | A1 | 6/2012 | Patel et al. |
| 2012/0173964 | A1 | 7/2012 | Wang et al. |
| 2013/0174268 | A1 | 7/2013 | Wang et al. |
| 2014/0019523 | A1 | 1/2014 | Heymann et al. |

FOREIGN PATENT DOCUMENTS

| | | |
|---|---|---|
| EP | 2069972 A1 | 6/2009 |
| JP | 2010503087 A | 1/2010 |
| JP | 5063697 B2 | 10/2012 |
| WO | 0133392 A2 | 5/2001 |
| WO | 03036481 A1 | 5/2003 |
| WO | 2004031986 A1 | 4/2004 |
| WO | 2008031647 A1 | 3/2008 |

OTHER PUBLICATIONS

Will, R., et al., "WebSphere Portal: Unified User access to content, applications and services," IBM Systems Journal, IBM Corp., vol. 43, No. 2, pp. 420-429, 2004.

U.S. Appl. No. 12/440,893, Non-final Office Action, dated Mar. 4, 2011, 17 pg.

U.S. Appl. No. 12/440,893, Final Office Action, dated Jan. 26, 2012, 20 pg.

U.S. Appl. No. 12/440,893, Non-final Office Action, dated Jul. 31, 2014, 37 pg.

U.S. Appl. No. 12/440,893, Final Office Action, dated Dec. 22, 2014, 33 pg.

U.S. Appl. No. 12/440,893, Examiner's Answer, dated Nov. 12, 2015, 60 pg.

U.S. Appl. No. 12/440,893, Decision on Appeal, dated Feb. 2, 2017, 15 pg.

U.S. Appl. No. 12/440,893, Notice of Allowance, dated Apr. 27, 2017, 7 pg.

* cited by examiner

DYNAMIC CONTEXT-SENSITIVE INTEGRATION OF CONTENT INTO A WEB PORTAL APPLICATION BY INSERTING A SUBTREE OF DYNAMIC CONTENT NODES INTO A MEMORY TREE OF CONTENT NODES

CROSS-REFERENCE TO RELATED APPLICATIONS

This is the U.S. National Stage of PCT/EP2007/056877 filed 6 Jul. 2007, which claims priority from European Patent Application No. 06120528.2 filed 21 Sep. 2006, which is assigned to the assignee of the present application, and the teachings of which are hereby incorporated by reference in their entirety.

BACKGROUND

The invention relates to a computer system for integration of content elements into a web portal application, and a method, data processing program, computer program product, and computer data signal therefor.

Portal systems of the state of the art require that, at a certain point of time, the contents of a web portal application are determined by an administrator or online editor. Whenever content elements of a web application, such as page elements or pages, portlets representing display elements or user controls, etc., are to be added or altered, an administrator or online editor must perform such action manually.

Thus, many web portal applications of the state of the art are rather overloaded with content elements to provide a variety of features in advance. This is to avoid having to manually customize different web portal applications specifically for different use scenarios. However, this results in inferior usability as users can be easily confused by the variety of content elements (or, operation support elements) that are displayed at the same time in the web portal application.

To improve this situation, it is known to bring content elements (such as portlets) that are not necessary in a certain user scenario, to a minimized window state (or similar), thus leaving only those content elements in a maximized window state that are necessary for a certain user interaction and should thus be in focus of the user's attention. However, solutions based on this approach still leave the problem of increased editorial or administrative effort and generally inflexible and overloaded web applications.

SUMMARY

An embodiment of present invention provides a computer system for integration of content elements into a web portal application that avoids the need of anticipatory integration of unnecessary content elements. Thus, usability may be improved and, at the same time, administrative effort may be reduced.

DETAILED DESCRIPTION

One embodiment of the disclosure provides a computer system for integration of web portal content elements into a web portal application. The computer system can include a portal server module for providing a web portal application to at least one user and an aggregation module, coupled to the portal server module, for integrating content nodes representing content elements into a memory tree reflecting the web portal application.

The system can further include a dynamic assembly module coupled to the aggregation module, a context launch transformation module coupled to the dynamic assembly module, and a context observer module coupled to the dynamic assembly module. The context observer module can be configured to detect context data and provide the data to the context launch transformation module. The context launch transformation module can be configured to include transformation logic and execute the logic depending on detected context data to generate a subtree of dynamic content nodes accordingly. The dynamic assembly module can be configured to associate transformation logic to an extension node being comprised in the memory tree. The dynamic assembly module can be further configured to provide the subtree of dynamic content nodes to the aggregation module. The aggregation module can be configured to insert the subtree of dynamic content nodes below the extension node.

In one embodiment, by implementing the present invention based on a standard portal server architecture comprising a portal server module and an aggregation module, inventive arrangements of the present disclosure can be integrated into a variety of well-accepted web portal server products, generally without requiring major modifications to existing portal server components. Additionally, by providing a dynamic assembly module, a context launch transformation module, and a context observer module, functional components are added to the standard portal architecture that integrate well and operate as follows to solve problems present in conventional systems, as previously detailed.

In one embodiment, by having the dynamic assembly module associate transformation logic to an extension node being included in the memory tree, a link is produced between program logic included in the context launch transformation module and a specific node that is part of a memory tree reflecting the web portal application provided by the portal server module and its elements. In this way, whenever an event is taking place with regard to the extension node, the corresponding transformation logic can be invoked, or the results of an execution of transformation logic can be related to the memory tree reflecting the web application at its proper place. For this, the dynamic assembly module is further configured to provide a subtree of dynamic content nodes to the aggregation module, which is configured to insert this subtree below the extension node into the memory tree reflecting the web portal application.

In one embodiment, by having the context launch transformation module include such transformation program logic and execute this logic accordingly, the system is enabled to dynamically change contents and behavior of content elements of the web portal application presented to the user. When such dynamic adaptation of web application behavior is based on context data as detected by the context observer module and provided to the context launch transformation module executing the transformation logic accordingly, the system is enabled to adapt the web portal application presented to the user according to the usage context a particular user is situated in at any point of time. Thus, content elements presented to the user within a web portal application can be added or removed or altered according to a user context or a usage condition, such as the user's current position in a navigational hierarchy or the user's working environment such as the computing environment or information about the portlet that has the input focus within the displayed web application, or even the input field of a form having the input focus, as well as the user's profile information, geographic location, time and/or date, actions most recently performed, etc.

Thus, a web portal server computer system embodiment of present disclosure enables users to present more concise page layouts (i.e., only as much pages as necessary) with pages that are not overloaded with unnecessary content elements. It is also highly usable, since it enables to thus not distract the user from the actually important content elements within a use scenario of the web application. The disclosed system also allows for dynamically adding or removing content elements at the time of use by an end user and also allows for dynamically manipulating the contents displayed within a content element based on changed conditions of the user environment, which enables even more advanced functionality.

One embodiment of the disclosure provides a method of integrating content elements into a web portal application. This method can include: associating an activation event to a transformation logic, by a dynamic assembly module; receiving an activation event at the context launch transformation module; detecting context data by a context observer module; providing the context data to the context launch transformation module, by the context observer module; executing the transformation logic depending on the context data while creating a subtree of dynamic content nodes, by the context launch transformation module; providing the subtree of dynamic content nodes to an aggregation module, by the dynamic assembly module; and, inserting the subtree of dynamic content nodes into a memory tree of content nodes representing content elements of a web application, by the aggregation module.

In the embodiment, by associating an event to a transformation logic, the dynamic assembly module defines the specific dynamic system behavior in answer to an event generated by a user interaction and/or an event generated by the portal system. By receiving such an activation event at the transformation module, proper handling of a generated event is thus provided.

Additionally, by detecting context data by a context observer module and providing the context data to the transformation module appropriately, dynamic behavior of the web application presented to the user is adapted to the specific usage context of a user scenario, when the transformation logic is appropriately executed depending on the detected context data. When, as a result of the proper transformation logic execution process, a subtree of dynamic content nodes is created by the transformation module and provided to the aggregation module, wherein creating a subtree of dynamic content nodes may also comprise a mere dynamic data update within an existing subtree of dynamic content nodes, the aggregation module inserts said subtree (or provides for an update respectively) into the memory tree of content nodes that represent the content elements of the web application presented to the user.

In this way, a method of operation is provided that operates well with the computer system for integration of web portal content elements into a web portal application and that provides for corresponding advantageous technical effects.

In an embodiment of the computer system, content nodes can represent web pages and/or portlets and thus the invention is enabled to handle the most common elements of known web portal applications.

When the system is, in an embodiment, configured such that its portal server module can receive a user interaction on an extension node comprised in the memory tree reflecting the web portal application presented to the user thus generating a user interaction activation event, and to forward this user interaction/activation event to the transformation module, the system is enabled to dynamically adapt content elements by executing transformation logic in answer to a user interaction event. In the same or in an alternative embodiment, the context observer module of the computer system is further configured to trigger transaction logic upon a change in the detected context data. In such an embodiment, a change of detected context data generates a trigger event which is in turn received by the context launch transformation module and thus enables the system to dynamically adapt content elements presented to the user based on context/environment information of a particular user scenario at a particular point of time, even independent of the presence of a preceding user interaction.

In addition to generating and delivering a subtree of dynamic content nodes according to detected context data and executed transformation logic and inserting this generated subtree, the computer system of present invention can be embodied to be further configured to dynamically update a generated subtree upon changed context data (by its context transformation module), and to provide the subtree update to the aggregation module. Thus, dynamic changes, particularly such in answer to an activation event triggered by the context observer module having detected a change in context data, can be applied to the memory tree reflecting the web portal application more efficiently.

In an embodiment of the system, the subtree comprises a node representing a main element and at least one node representing operation supporting elements. The subtree is thus specifically adapted for scenarios in that such main elements are used as content elements only used once within a page presented as part of the web portal application in order to fulfill a particular user operation, such as booking a flight, hotel or rental car, and wherein in the same scenario operation supporting elements are used as reusable fragments which can be used on multiple pages on a web portal application and which are only needed temporarily while carrying out the operation mentioned above and which should be displayed only as long as they are necessary within carrying out this operation. For instance, a page may comprise a hotel booking main element which also comprises a dynamic calendar portlet as an operation support element, however only as long as needed for entering a specific date in the course of booking the hotel.

Another embodiment may comprise a subtree wrapper object being configured to feed initialization data to a transformation logic comprised in the transformation module. The subtree wrapper object may be further configured to retrieve the subtree. In these embodiments, a practical implementation for triggering transformation logic and/or retrieving the result of transformation logic execution is selected, which integrates well with existing techniques of integrating content elements into a memory tree reflecting the web portal application as performed by the aggregation module. An implementation of the subtree wrapper object may also include a configuration in which the aggregation module is configured to activate the subtree wrapper object upon encountering an extension node, wherein the subtree wrapper object in turn feeds initialization data to the transformation logic and retrieves the subtree of dynamic content nodes.

In a corresponding manner, the method of present disclosure can be embodied to comprise receiving user interaction on an extension node of the memory tree as receiving an activation event as well as receiving a trigger event generated by the context observer module upon changed context data as the activation event. Further, the method can be embodied to comprise updating the subtree of dynamic content nodes upon changed context data, by the transformation module, and providing the subtree update to the aggregation module, by the dynamic assembly module, corresponding to the embodiment of the computer system.

The method can further be embodied to comprise activating a subtree wrapper object by the aggregation module upon encountering an extension node in the memory tree of content nodes, the method further comprising feeding initialization data to a transformation logic by the subtree wrapper object. The method can also have an embodiment wherein providing the subtree of dynamic content nodes to an aggregation module is performed in answer to a request of the subtree wrapper object.

Advantages and operation of the embodiments of the method correspond to the embodiments of the computer system.

Figure 1:
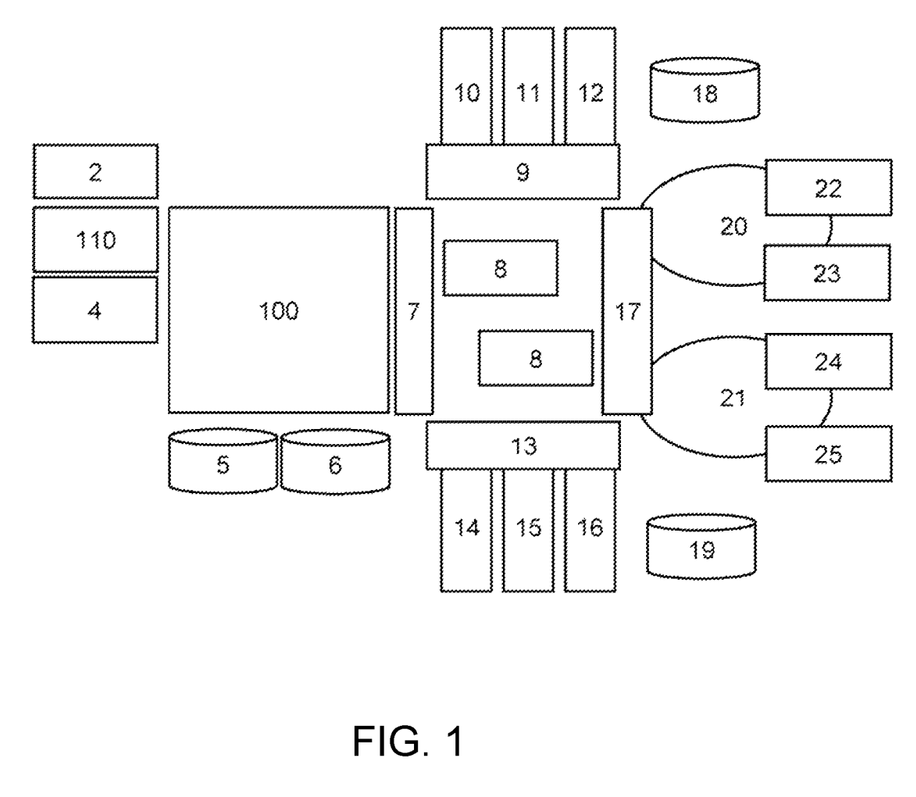
FIG. 1 shows a schematical overview of a web portal server computer system of the state of the art.

FIG. 1 schematically illustrates the system architecture of a web portal server computer system in accordance with an embodiment of the inventive arrangements disclosed herein. Portal server module 100 provides a web portal application to at least one user, typically over the internet using the hypertext transfer protocol (HTTP), and handles user requests accordingly. To control and selectively grant or deny access to web applications or parts of web applications, authorization module 2 checks access permissions for particular users. In the embodiment, exclusively aggregation module 110 determines content elements of a web application that are to be displayed and the way in which they are displayed (e.g. the type of navigation and web pages and the layout of web pages). To do so, aggregation module 100 typically builds and maintains a memory tree reflecting the web portal application. The memory tree includes content nodes representing content elements. Such a memory tree generally serves as a treelike navigation topology model.

WSRP/SOAP router 4 allows to properly direct requests to portlets located at remote portals to include contents in local web applications. WebSphere member subsystem 5 provides for a connection to a user registry in which all users of the web portal are registered. WebSphere portal data store 6 provides a connection to a persistent storage medium, such as a database, in which all relevant portal content data (such as the contents of one or a more of web applications, such as web pages, portlets, and structures) are persistently stored. Portlet API (application programming interface) 7 provides an interface for programming portlets 8. Portlet services 9 encompass credential vault module 10 to store and retrieve credentials/passwords, search module 11 to provide portal-wide search functionality, and content management module 12 for managing content elements, such as pages or portlets, in the portal. This can be comparable to functionality typical of a content management system (CMS). J2EE APIs 13 (Java 2 Platform, Enterprise Edition) provide an application programming interface for accessing distributed Java applications, or application components, running on an application server. JCA connectors (Java EE Connector Architecture) provide the portal system with access to legacy systems, such as existing enterprise information systems (EIS). Enterprise Java Beans 15 are managed, server-sided components for modular construction of enterprise applications and thus are J2EE components of the application layer. Using the WSRP/SOAP-interface 17, portlets and/or web services of remote locations can be accessed and included in local web applications. Such services may include corporate web services 22 or corporate WSRP services 23 to be accessed over intranet 20, or public WSRP services 24 and public web services 25 to be accessed over internet 21. Such services can be looked up in a directory of available services, such as global UDDI directory 19 for public services 24 and 25, or corporate UDDI directory for corporate services 22 and 23, respectively. Also, where not explicitly indicated by intersecting graphical elements, elements in FIGS. 1 and 2 are directly or indirectly connected by appropriate data channels.

Figure 2:
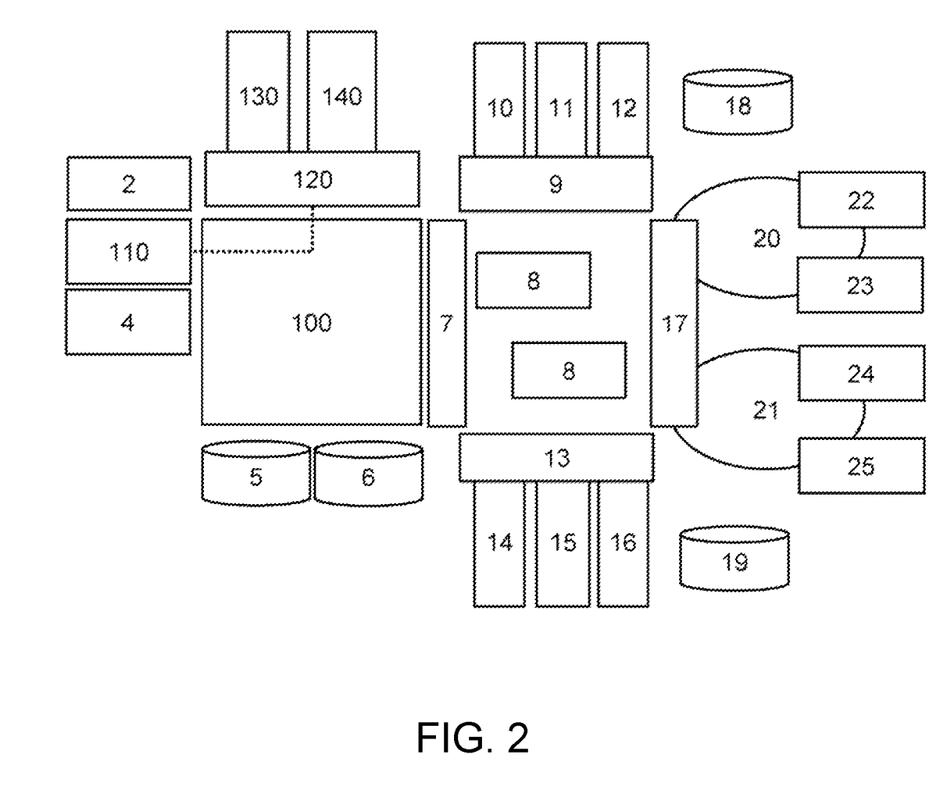
FIG. 2 shows a schematical overview of the architecture of an embodiment of the computer system of present invention.

FIG. 2 shows the architecture of a web portal server computer system, in which, based on the components as shown in FIG. 1, an embodiment of present invention is realized by adding dynamic assembly module 120, context observer module 130, and context launch transformation module 140, and by adapting aggregation module 110 appropriately, as will be explained in more detail below. Remaining components with like reference numerals denote equivalent or identical components.

Aggregation module 110 is configured to, among plain content nodes, handle dedicated extension nodes, to which a specific program logic (transformation logic) is associated. The aggregation module 110 is further configured to receive and insert a subtree of dynamic content nodes below such an extension node in the memory tree reflecting the web application. Dynamic assembly module 120 is configured to provide for such an association of transformation logic to an extension node. The transformation logic can be included in context launch transformation module 140, which also serves to execute the transformation logic. Typically, such transformation logic comprises program instructions to create or manipulate a subtree of dynamic content nodes, such as a subtree of pages and portlets. Context observer module 130 is configured to detect context data, such as a portal user's current position in a navigational topology of content elements of a web application (e.g., the current page of a web application a user is accessing), as well as a user's current working environment, profile information, geographic location, locale settings, current time and/or date, actions most recently performed within the portal, other users available for collaboration, available tasks (e.g., in those cases where working in a business process integration environment), etc.

The context observer module is configured to provide the context data such detected upon request to the context launch transformation module 140 and thus provide parameters for appropriate conditional execution of transformation logic. Moreover, context observer module 130 is configured to generate, upon a specified change of context data or another context data condition, an activation event to trigger execution of transformation logic within context launch transformation module 140.

Operation of the components described will be further explained with reference to the method of present invention and FIG. 3.

Figure 3:
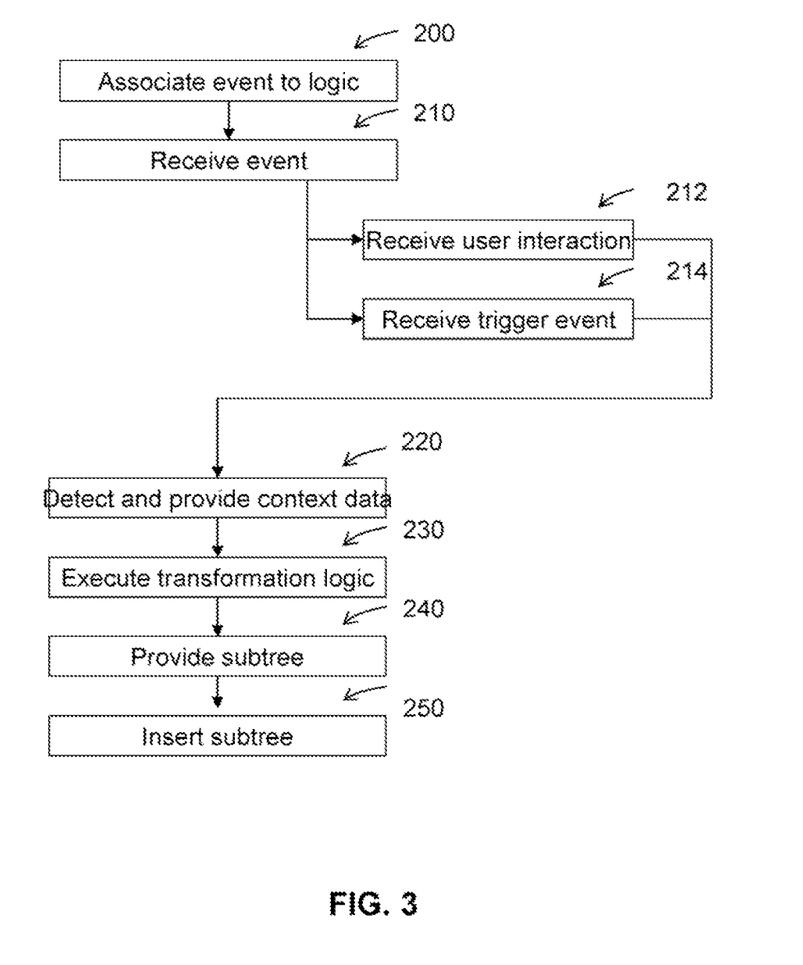
FIG. 3 shows a schematical overview of an embodiment of the method of present invention.

Referring to FIG. 3, for a particular extension node comprised within the memory tree reflecting the web portal application, an activation event is associated to transformation logic by dynamic assembly module 120 in step 200. An activation event is received at the transformation module 140 in step 210, which may either be receiving an activation event generated from a user interaction received through portal server module 100 and/or aggregation module 110 in step 212, or receiving an activation event generated by context observer module 130 upon change of context data in step 214. In a practical scenario, for instance, a user interaction event is generated when a user clicks at an extension node displayed on a page of the web application.

In step 220, context observer module 130 detects and provides context data to context launch transformation module 140 for appropriate execution of the respective transformation logic. When executing the transformation logic in step 230, context launch transformation module 140 generates or manipulates a subtree of dynamic content nodes (submodel) that describes a set of web pages and/or portlets. Dynamic assembly module 120 then provides the newly created or updated subtree of dynamic content nodes to aggregation module 110 which in turn inserts the updated or newly created subtree of dynamic content nodes into the memory tree. In order to integrate well with existing portal server system architectures, a wrapper object, such as a dynamic assembly tree model wrapper, can be used. When aggregation module 110 traverses the memory tree of content elements that are comprised in a web portal application, and, in that course, encounters an extension node which has been assigned a transformation logic, it activates the dynamic assembly tree model wrapper object which serves to call the associated transformation and feeds initial data (request and input model) to the transformation and retrieves, as the result of the execution of the transformation logic, the subtree of dynamic content nodes (submodel/subtopology) to be inserted by the aggregation module below said extension node. Thus, user action as well as changes in the user environment not directly influenced by user behavior can trigger dynamic manipulation and dynamic addition or deletion of nodes (pages and/or portlets).

Figure 4:
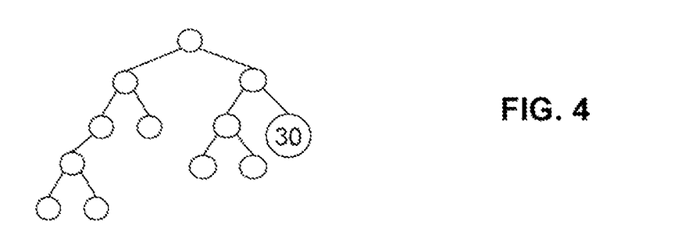
FIG. 4 shows a memory tree of content elements of a web portal application containing an extension node.
Figure 5:
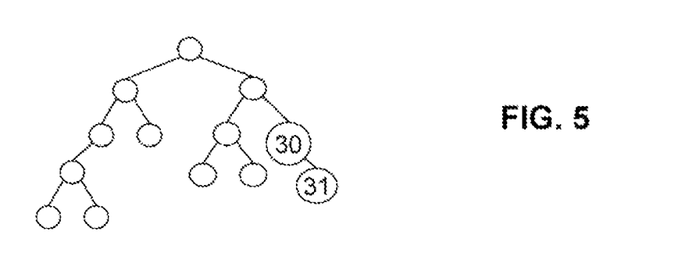
FIG. 5 shows the memory tree of FIG. 4 containing a dynamic page.

FIG. 4 shows a memory tree of content nodes indicated by circles with one extension node 30. In the case illustrated, extension node 30 has no dynamic sub elements yet. Either through an activation event triggered by a context change or through an activation event triggered by a user interaction, transformation logic associated to extension node 30 is activated and executed and may result in the appropriate transformation logic returning a single dynamic page (i.e., a subtree with one single node) 31 shown in FIG. 5.

Figure 6:
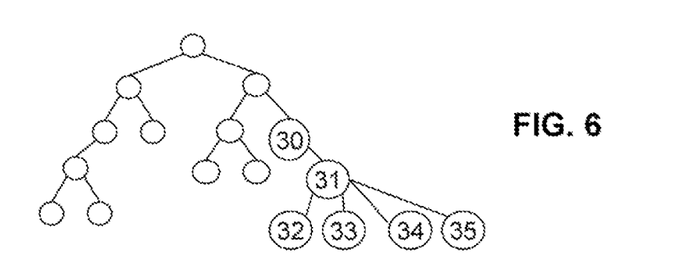
FIG. 6 shows the memory tree of FIG. 5 further containing portlets and/or pages as main and operation supporting elements.

Upon further user interaction or context changes, the subtree may be manipulated as described earlier to comprise portlet elements 32 to 35 as shown in FIG. 6. Content elements 32 to 25, regardless if web pages or portlets, can be specified as main elements (node 32) and operation support elements (nodes 33 to 35). While both kinds of content elements, main elements as well as operation supporting elements, can be treated in the same way according to the system and method as described above, it could be advantageous to use main element 32 as an element for handling the execution of a transaction, such as booking a hotel, while operation supporting elements 33 to 35 are auxiliary elements for carrying out particular steps within the overall execution of a hotel booking, etc. A practical example for operation supporting elements could be calendar elements or geographic locators/visualizers, etc. Typically, operating supporting elements are reusable fragments applicable for a variety of different scenarios, each represented with a main element, with operation supporting elements typically being visible only temporarily and only as long as they are necessary for completion of a particular transactional step within the overall transaction as represented by the main element.

Thus, not only reusability of technical components is dramatically increased and thus administrative and online editorial effort reduced, but also the focus of attention of users is enabled to not be distracted from important elements.

Further, it may be feasible to extend the system as presently described by making the display of operation supporting elements dependent on user input exclusively specifying if certain content elements should be displayed or not, for instance by drag-and-drop operations or specific launch buttons that activate display of a higher number of operation supporting elements by default.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

To avoid unnecessary repetitions, explanations given for one of the various embodiments are intended to refer to the other embodiments as well, where applicable. Reference signs in the claims shall not be construed as limiting the scope. The use of "comprising" in this application does not mean to exclude other elements or steps and the use of "a" or "an" does not exclude a plurality. A single unit or element may fulfill the functions of a plurality of means recited in the claims.

REFERENCE NUMERALS

2 Authorization Module
4 WSRP/SOAP Router
5 Portal Member Subsystem
6 Portal Server Data Store
7 Portlet API
8 Portlets, Servlets, Proxies
9 Portlet Services
10 credential Vault
11 Search
12 Content Management
13 J2EE APIs
14 JCA Connectors
15 Enterprise Java Beans
16 Message/Agent/BP Beans
17 WSRP/SOAP
18 Corporate UDDI Directory
19 Global UDDI Directory
20 Intranet
21 Internet
22 Corporate Web Services
23 Corporate WSRP Services
24 Public WSRP Services
25 Public Web Services
30 Extension Node
31 Dynamic Page
32 Portlet, Main Element
33-35 Portlets, Operation Supporting Elements
100 Portal Server Module
110 Aggregation Module
120 Dynamic Assembly Module
130 Context Observer Module
140 Context Launch Transformation Module
200 Associate Event to Logic
210 Receive Event
212 Receive User Interaction
214 Receive Trigger Event
220 Detect and Provide Context Data
230 Execute Transformation Logic
240 Provide Subtree
250 Insert Subtree

The invention claimed is:

1. A computer-implemented method by a portal server, comprising:
  automatically and dynamically creating a subtree of dynamic content nodes representing content not previously contained in a navigation topology of a web portal application;
  executing, responsive to receiving an activation event based upon a user action in the web portal application and while providing the web portal application, transformation logic based upon context data indicating a user context; and
  inserting, responsive to the transformation logic being executed, the subtree of dynamic content nodes into a memory tree of content nodes representing content elements in the navigation topology of the web portal application.

2. The method of claim 1, wherein
the activation event includes a user interaction on an extension node within the memory tree.

3. The method of claim 1, wherein
the activation event includes a trigger event.

4. The method of claim 1, wherein
the subtree of dynamic content nodes is updated based upon a detected change in the context data.

5. The method of claim 1, wherein
a subtree wrapper object is activated upon encountering an extension node in the memory tree of content nodes; and
initialization data is fed to the transformation logic by the subtree wrapper object.

6. The method of claim 1, wherein
the created subtree includes a node representing a main element and at least one node representing operation supporting elements, and
the created subtree represents content obtained by the portal server by accessing at least one distributed application outside the portal server via at least one application programming interface.

7. A portal server, comprising:
  a hardware processor configured to initiate the following operations:
    automatically and dynamically creating a subtree of dynamic content nodes representing content not previously contained in a navigation topology of a web portal application;
    executing, responsive to receiving an activation event based upon a user action in the web portal application and while providing the web portal application, transformation logic based upon context data indicating a user context; and
    inserting, responsive to the transformation logic being executed, the subtree of dynamic content nodes into a memory tree of content nodes representing content elements in the navigation topology of the web portal application.

8. The system of claim 7, wherein
the activation event includes a user interaction on an extension node within the memory tree.

9. The system of claim 7, wherein
the activation event includes a trigger event.

10. The system of claim 7, wherein
the subtree of dynamic content nodes is updated based upon a detected change in the context data.

11. The system of claim 7, wherein
a subtree wrapper object is activated upon encountering an extension node in the memory tree of content nodes; and
initialization data is fed to the transformation logic by the subtree wrapper object.

12. The system of claim 7, wherein
the created subtree includes a node representing a main element and at least one node representing operation supporting elements, and
the created subtree represents content obtained by the portal server by accessing at least one distributed application outside the portal server via at least one application programming interface.

13. A computer program product, comprising:

a computer readable storage device having stored therein program code, the program code, which when executed by a computer hardware system of a portal server, causes the computer hardware system to perform:

automatically and dynamically creating a subtree of dynamic content nodes representing content not previously contained in a navigation topology of a web portal application;

executing, responsive to receiving an activation event based upon a user action in the web portal application and while providing the web portal application, transformation logic based upon context data indicating a user context; and inserting, responsive to the transformation logic being executed, the subtree of dynamic content nodes into a memory tree of content nodes representing content elements in the navigation topology of the web portal application.

14. The computer program product of claim 13, wherein the activation event includes a user interaction on an extension node within the memory tree.

15. The computer program product of claim 13, wherein the activation event includes a trigger event.

16. The computer program product of claim 13, wherein the subtree of dynamic content nodes is updated based upon a detected change in the context data.

17. The computer program product of claim 13, wherein a subtree wrapper object is activated upon encountering an extension node in the memory tree of content nodes; and initialization data is fed to the transformation logic by the subtree wrapper object.

18. The computer program product of claim 13, wherein the created subtree includes a node representing a main element and at least one node representing operation supporting elements, and the created subtree represents content obtained by the portal server by accessing at least one distributed application outside the portal server via at least one application programming interface.

* * * * *